United States Patent Office 3,194,791
Patented July 13, 1965

3,194,791
TIN SALTS CATALYSTS FOR POLY-
ESTERIFICATION PROCESS
Earl W. Wilson and James E. Hutchins, Kingsport, Tenn.,
assignors to Eastman Kodak Company, Rochester,
N.Y., a corporation of New Jersey
No Drawing. Filed Feb. 23, 1962, Ser. No. 183,316
1 Claim. (Cl. 260—75)

This invention relates to an improved method using tin carboxylate catalysts for making low molecular weight polyesters having a molecular weight of the order of 400 to 4000 from a dicarboxylic acid, a branched-chain glycol, and, optionally, a chain terminating acid or alcohol. Such polyesters have utility as polymeric plasticizers, components in the manufacture of urethane foams, coatings and elastomers, and as additives for functional fluids such as synthetic lubricants.

These polymers are particularly to be distinguished from linear, high melting high molecular weight fiber forming polyesters produced by reaction between a dicarboxylic acid and/or ester and a glycol, which reaction usually is carried out in two stages in which (1) the ester is heated with an excess of glycol under conditions which forms the glycol ester of the acid and (2) the glycol ester of the acid is heated at a high temperature such as 250–300° C. under vacuum to remove excess glycol and the build up a long molecular chain.

In the prepartion of such linear, high melting, fiber forming polyesters, a catalyst is required to promote both stages of the reaction. The catalyst must be stable at the high reaction temperatures employed and must be specific in promoting only the desired reaction because very small quantities of by-product will produce color in the product or will prevent chain growth. Polyesters of this type normally have molecular weights in the range of 15,000 or more up to well above 100,000. In contrast the low molecular weight polyesters of the instant invention are prepared by a one-step reaction, are characterized by molecular weights in the range of 400 to 4,000 and are produced by an improved method which depends upon the employment in the reaction of an amphoteric metal catalyst.

This invention is a continuation-in-part of our copending application Serial No. 860,673, filed December 21, 1959, Process for Preparing Polyesters Using Free Acids. In our copending application, the improvement is based upon the use of a two component catalyst system including an amphoteric metal and an alkali metal and the utility of this novel and synergistic catalyst system has been established. However, it has also been found that certain advantages can be obtained through the use of certain tin compounds alone.

The use of tin, aluminum, titanium and other amphoteric metals as such, or in the form of hydroxides, alkoxides, etc., have been sometimes described in patents and in the literature as ester interchange catalysts. This phenomenon of ester interchange is characterized by the reaction of a diester of a dicarboxylic acid with a glycol, resulting in the elimination of the monohydric alcohol to produce a prepolymer of a linear polyester. The use of aluminum alcoholates in such a reaction has been reported in the literature. For example, Rehburg and Fisher, J.A.C.S., 66, 1203, 1944, cite the use of aluminum alcoholates as alcoholysis catalysts in the preparation of certain polymeric materials. According to other published literature, linear polyesters are usually prepared by a method of transesterification which is a more economical process than the direct esterification method when the required reaction periods are considered. Many references are made to the use of various catalysts, generally of a metallic type, in the transesterification process. However, these catalysts, with the exception of certain amphoteric compounds, are indicated to have relatively little or no catalytic activity in direct esterification reactions starting with the free carboxylic acids.

Polymeric plasticizers having molecular weights of from 800 to 4,000 or more have ben described in various patents, such as U.S. 2,617,779, in the literature, and in various copending applications assigned to the assignee of the instant application, such as Hutchins, et al., Serial No. 662,974, filed June 3, 1957 (now abandoned), covering preparation of neopentyl glycol polymers, Caldwell, Serial No. 662,972, filed June 3, 1957, covering preparation of dimethyl malonic acid polymers, and Kibler et al., Serial No. 823,297 filed June 29, 1959, covering preparation of 1,4-cyclohexanedimethanol polyesters and other polymers, etc. Such polymers can be prepared solely from dicarboxylic acids and glycols or they can be prepared therefrom with the additional use of a monofunctional alcohol or acid as a chain terminator. Such polymers having hydroxyl end groups are useful as intermediates in preparing urethane polymers as well as for use as plasticizers and other products.

Formation of a polyester by the non-catalyzed reaction of a dibasic acid with a branched-chain dihydric alcohol, such as neopentyl glycol, often requires a lengthy reaction period. Side reactions and cracking of the polyester result from this extended reaction period at the high temperatures normally employed in polyesterifications. These conditions also induce the formation of polyesters of dark color, a factor which seriously limits their usefulness and is especially difficult to overcome when branched-chain glycols are employed.

The polyesterification reaction may be shortened considerably by the use of conventional, acid-type esterification catalysts. However, there are two major objections to their use. They impart to the finished product certain undesirable properties, such as high acid values, high color and unsatisfactory mechanical and electrical properties. The acid-type catalysts are also difficult to remove after the reaction is complete. As a result, these catalysts are not generally employed in commercial direct-esterification processes.

All prior work shows that it is most advantageous by prior art techniques to prepare a simple ester of the dibasic acid and then react this simple ester with the glycol to prepare the polyester. The instant invention circumvents this step of preparing the simple ester and provides a means whereby the polyester may be prepared directly from the dicarboxylic acid and the glycol. The disclosure by Newby in British Patent 733,870, for example, shows that simple esters may be prepared from anhydrides of dibasic carboxylic acids and alcohols using as a catalyst a mixture of compounds of amphoteric metals and alkaline substances. See also Danish Patent 44,122 and British Patent 810,381. However, the best catalyst systems for the direct esterification have been generally considered in most situations to be those catalysts which were acidic in nature. Such compounds as sulfuric acid, paratoluene sulfonic acid, and various alkylated sulfonic acids have been widely used as catalyst systems for direct esterifications. Also widely mentioned in the prior art are acidic salts, such as zinc chloride and aluminum chloride. However, these materials, although suited for use with certain alcohols and glycols, are not suited for certain materials which are known to degrade in the presence of highly ionic substances. Notable among such compounds are the branched-chain 1,3-glycols, such as 2,2-dimethyl-1,3-propanediol, 2,2,4-trimethyl-1,3-pentanediol, 1,3-butylene glycol and 2,2,4,4-tetramethyl-1,3-cyclobutanediol.

Under conditions of high temperature, in the presence of such ionic substances, these glycols have a tendency to break down. The following literature references serve to point out the susceptibility of branched-chain 1,3-glycols to cleavage in either acidic or basic media: Zimmerman and English, J.A.C.S., 76, 2285, (1954), Brannock and Lappin, J.A.C.S., 77, 6052 (1955), Perry et al., J.A.C.S., 80, 3618 (1958) and Searles et al., J. Org. C, 24, 1770 (1959).

The products of the degradation of such glycols contribute greatly to the high acid values, high color, and unsatisfactory mechanical and electrical properties of the resulting polyesters. For this reason such ionic catalyst systems cannot be tolerated in commercial practice.

It is an object of this invention to provide an improved process for preparing low molecular weight polyesters.

A further object is to provide improved catalytic compositions for such a process.

A further object of the instant invention is to provide a process whereby low molecular weight polyesters may be prepared directly from a dicarboxylic acid and a branched-chain glycol.

A further object of the invention is to provide an improved catalytic process for the preparation of low molecular weight polyesters directly from a free dicarboxylic acid.

Another object is to provide an improved catalytic process for the preparation of low molecular polyesters which circumvents the lengthy reaction periods normally encountered in prior art processes for preparing such polyesters.

An additional object of the invention is to provide an improved catalytic process for the preparation of low molecular weight polyesters which avoids undesirable side reactions, such as cleavage of the glycol, with subsequent formation of undesirable by-products.

A further object of the invention is to provide a process for the preparation of low molecular weight polyesters of low acid number.

Another object of the invention is to provide a process for the preparation of low molecular polyesters with low color.

A still further object of the invention is to provide a process whereby branched chain glycols which are often subject to ionic degradation are readily and easily converted into stable, low molecular weight polyesters.

Other objects will appear hereinafter.

According to the prefered embodiment of this invention there is provided a proces for preparing a linear polyester having less than 0.6% residual acid and a molecular weight ranging from 400 to 4,000 starting with a free dicarboxylic acid consisting essentially of heating for about 5 to 10 hours at a temperature of 150° C. to 300° C. at about atmospheric pressure (A) one mole proportion of a dicarboxylic acid containing from four to forty carbon atoms including a major portion of an aliphatic acid having from four to twelve carbon atoms (B) from 0.5 to 2 mole proportions of a dihydroxy compound containing from two to twenty carbon atoms including a major portion of a branched-chain aliphatic glycol and (C) from 0 to 0.6 mole proportions of a chain terminator selected from a group consisting of monocarboxylic acids and monohydric alcohols containing from four to forty carbon atoms, in the presence of 0.001 to 3 percent of tin by weight based on (A), (B) and (C) of a catalyst selected from the group consisting of the neutral and basic salts of tin as monobasic and dibasic (1–20 carbons) salts whereby a substantially colorless polyester is obtained.

The catalytic amounts which can advantageously be used range from 0.001% to 3% by weight based on the total reaction mixture (A, B and C, if any) and preferably in the range of 0.01% to 1% by weight. The catalyst concentrations are based upon the total weight of the reaction mixture including constituents designated as (A), (B) and (C). The catalytic amount used should be calculated as percent tin.

In the following examples and description we have included several preferred embodiments of our invention but they are included merely for purposes of illustration and not as a limitation thereof.

*Example I.—No catalyst*

A two-liter, three-neck flask was equipped with a thermometer, mechanical stirrer, water separator, and reflux condenser. The flask was charged with 4.5 moles (468 grams) of neopentyl glycol and 3 moles (438 grams) of adipic acid. The temperature was increased until it had reached 220° C. The temperature was then held at this point throughout the course of the reaction. As soon as the ingredients had reached the liquid state, agitation was started. Samples were taken from the mass at regular intervals so that the percent acid might be calculated. This was taken as a measure of the rate of the reaction. The following table demonstrates the results of this reaction:

| Time, hours | Percent acid as adipic |
|---|---|
| 0 | 29.74 |
| 1 | 5.00 |
| 2.5 | 2.50 |
| 3 | 2.15 |
| 4 | 1.80 |
| 5 | 1.60 |
| 6 | 1.40 |
| 22 | 0.99 |
| 24 | 0.88 |
| 27 | 0.90 |
| 30 | 0.87 |

It will be noted that this uncatalyzed reaction required about 22 hours to reduce the acidity to about 1%; the acidity was not appreciably reduced beyond this level by additional reaction; the product of the reaction had poor color, being 5 on the Gardner Scale.

In contrast to the results obtained in Example I, additional examples are given below demonstrating the improvement obtained when various catalytic substances of the instant invention are employed.

*Example II.—Stannous oxalate*

The following reaction is provided to demonstrate the use of stannous oxalate as the catalyst in accordance with our invention.

The reaction conditions and procedure were as indicated in Example I except that 0.79 gram of stannous oxalate was used. The reaction proceeded as follows:

| Time, hours | Percent acid as adipic |
|---|---|
| 0 | 26.89 |
| 2 | 0.69 |
| 4 | 0.54 |
| 6 | 0.50 |
| 24 | 0.54 |
| 28 | 0.49 |
| 30 | 0.51 |

This polyester from this reaction had a Gardner color of less than one. It will be obvious that there has been a significant reduction in reaction time and in residual acid concentration.

The reaction conditions and procedure as in Example I have also been performed except that dibutyl tin oxide was used. However, less advantageous results were obtained thereby indicating an unobviously superior utility in the employment of stannous oxalate.

The unobviously advantageous utility of the tin compounds in the subject invention may be further illustrated when compared with other amphoteric catalysts as shown in the following example:

*Example III.—Basic aluminum acetate*

The procedure was that described in the previous example except that 2.72 grams of basic aluminum acetate were added. The following is a table of the progress of this reaction:

| Time, hours | Percent acid as adipic |
|---|---|
| 0.0 | 26.24 |
| 3.0 | 1.73 |
| 5.0 | 1.06 |
| 22.0 | 0.60 |
| 30.0 | 0.57 |

While the use of basic aluminum acetate as catalyst does offer some advantage over the use of no catalyst as cited in Example I, the product of this reaction had a relatively high color, Gardner color of 3, and gelled on standing. It will also be noted that the rate of reaction was considerably less than that previously cited for both stannous oxalate.

The practice of our invention is further illustrated by use of stannous phthalate as the catalyst as shown in the next example.

Example IV.—Stannous phthalate

The esterification was conducted in the manner and according to the procedure outlined in Example I. However, in this case there was added 1.08 grams of stannous phthalate. Addition to the catalyst was made when the melt had reached a temperature of 170° C., and zero time was taken five minutes after catalyst addition. The following demonstrates the progress of this reaction:

| Time, hours | Percent acid as adipic |
|---|---|
| 0 | 26.51 |
| 2 | 0.72 |
| 4 | 0.60 |
| 5 | 0.53 |
| 6 | 0.51 |
| 24 | 0.49 |
| 28 | 0.50 |
| 30 | 0.51 |

It is again obvious that the same order of improved results as obtained in Example II were also obtained in this example and the color of the polyester obtained was 1 on the Gardner scale.

Examples of the constituents which constitute the polymers which can be prepared according to this invention include constituents designated above as (A), (B), and (C) as follows:

(A) *Dibasic carboxylic acids.*—These include primarily aliphatic acids although aromatic, heterocyclic, and other types are contemplated in minor proportions. Examples include terephthalic, cyclohexanedicarboxylic, succinic, naphthalene dicarboxylic, norcamphanedicarboxylic, carbonic, dimerized fatty acids, trimerized fatty acids, paracarboxycarbanilic, suberic, azelaic, adipic, glutaric, sebacic, dimethylmalonic, alpha-ethylsuberic, oaxlic, alpha-diethyl adipic, dicarboxy diethyl ether, ortho-phthalic, hexahydro-o-phthalic, sulfonyldipropionic, and many other such acids. Examples of the especially preferred alphatic dicarboxylic acids include adipic, succinic, azelaic, suberic, sebacic, glutaric, pimelic, dimethyl malonic, and other straight or branched chain acids having from four to twelve carbon atoms.

(B) *Dihydroxy compounds.*—These include aromatic, aliphatic, heterocyclic, and other types as in regard to constituents (A). Preferably the hydroxy radicals are attached to a methylene group as in a glycol, i.e., the compound is a dihydroxy methyl compound, such as ethylene glycol, 1,1-decanediol, neopentyl glycol, 1,4-bishydroxymethylbenzene, norcamphanedimethanol, etc. Other dihydroxy compounds include hydroquinone, dihydroxynaphthalene, resorcinol, etc. Such compounds generally contain from two to twenty carbon atoms if they are monomeric in nature; however, the dihydroxy compounds contemplated also include the polyethylene glycols, poly(tetramethylene glycol), diethylene glycol, triethylene glycol, various low polymers which are bifunctional hydroxy compounds which may contain internal ether, thioether, sulfone, carboxy, urethane, and other linkages. As already explained, this invention applies to a process wherein the glycol is for the most part a branched-chain glycol; examples include 2-methyl-1,5-pentanediol, 2,2,4-trimethyl-1,3-pentanediol, 1,3-butylene glycol, 2,2-dimethyl-1,3,-propanediol, 2-methyl-2-ethyl-1,3-pentanediol, 2-ethyl-2-butyl-1,3-pentanediol, 2,2,4,4-tetramethyl-1,3-cyclobutanediol, 2,2,2-diethyl-3-isopropyl-1,3-propanediol, etc. It is preferred that constituent (B) be entirely made up of one or more aliphatic or alicyclic glycols, especially neopentyl glycol, 2,2,4-trimethyl-1,3-pentanediol, 2,2,4,4-tetramethyl-1,3-cyclobutanediol, or 1,4 - cyclohexanedimethanol. The especially preferred glycols contain from two to twelve carbon atoms.

(C) *Chain terminator.*—These include monobasic acids and monohydric alcohols containing four to forty carbon atoms and are preferably aliphatic in character. Example of alcohols include 2-ethylhexanol, 2,2-dimethylpentanol, 2,2,4-trimethylpentanol, 2,2-dimethylhexonal, lauryl alcohol, decanol, etc. Examples of acids include 2-ethylhexanoic acid, pelargonic acid, neo-fat acid, caproic acid, 2,2-dimethylhexanoic acid, etc.

The process of the present invention is in some of its details well-known in the art as generally set forth in many patents. A copending application by co-workers in the same laboratories with the inventors discusses some of these details, viz., Caldwell application, Serial No. 662,-972, filed June 3, 1957, which covers polyesters of dimethylmalonic acid.

As has already been made plain, the instant invention in its preferred form relates to low molecular weight, linear polyesters prepared from aliphatic free acids (not anhydrides or methylesters) using specific amphoteric metal catalysts whereby the dicarboxylic acid concentration after reacting (A) and (B) for five hours is less than 0.6% residual acid and the polyesters obtained have a color no greater than a Gardner color of approximately one. When polymeric plasticizers are being produced by the process of this invention in one of its most preferred embodiments, there is present a chain terminator during the reaction. The process of this invention is particularly not to be confused with the preparation of high molecular weight linear polyesters capable of forming fibers for fabrics, plastics, etc.

In addition to the use of these catalysts for the preparation of saturated linear, low molecular weight polyesters, they may be used in the preparation of certain unsaturated polyesters. In this type of preparation, however, it is not customary to go to the very low acid numbers that are often encountered in the saturated type. It is, nevertheless, important that a low acid number be achieved in a minimum period of time and with a minimum color build-up. This is to prevent the unnecessary exposure of the unsaturated polyester to an extended heat history which results in some degree of addition polymerization. Color is particularly important where the polyester resin is to be used in preparing fiberglass-reinforced, translucent panels for architectural purposes.

This application claims subject matter disclosed in appliants' prior copending application Serial No. 860,673, filed December 21, 1959, now U.S. Patent No. 3,055,869. Reference is made to footnote 7, column 6, of that patent.

The invention has been described in detail with particular reference to preferred embodiments thereof, but it will be understood that variations and modifications can be effected within the spirit and scope of the invention as described herein above and as defined in the appended claim.

We claim:

A process for preparing a polymeric linear polyester having less than 0.6% residual acid and a molecular weight ranging from 400 to 4,000 starting with a free dicarboxylic acid consisting essentially of heating for about 5 to 10 hours at a temperature of 150° C. to 300° C. at about atmospheric pressure (A) one mole proportion of a dicarboxylic acid containing from four to forty carbon atoms including a major portion of an alphatic acid having from four to twelve carbon atoms (B) from 0.5 to 2 mole proportions of a dihydroxy compound containing from two to twenty carbon atoms including a major portion of a branched-chain aliphatic glycol selected from the group consisting of 2,2-dimethyl-1,3-propanediol, 2,2,4-trimethyl-1,3-pentanediol and 2,2,4,4-tetramethyl-1,3-cyclobutanediol and (C) from 0 to 0.6 mole proportion of a chain terminator selected from a group consisting of monocarboxylic acids and monohydric alcohols containing from four to forty carbon atoms in the presence of a catalytic amount of a catalyst consisting essentially of stannous phthalate, said catalytic amount being calculated as 0.001 to 3 percent of tin by weight based on (A), (B) and (C), said process yielding a finished polyester having an acid concentration of less than 0.6% in no more than about five hours of said heating, said finished polyester having a Gardner color not greater than about 1.

References Cited by the Examiner
UNITED STATES PATENTS

| | | | |
|---|---|---|---|
| 2,720,507 | 10/55 | Caldwell | 260—75 |
| 2,936,324 | 5/60 | Hasek et al. | 260—75 |
| 3,055,869 | 9/62 | Wilson et al. | 260—75 |
| 3,057,824 | 10/62 | Le Bras | 260—75 |

FOREIGN PATENTS

| | | |
|---|---|---|
| 44,122 | 5/31 | Denmark. |
| 1,005,947 | 4/57 | Germany. |

WILLIAM H. SHORT, *Primary Examiner.*

LOUISE P. QUAST, *Examiner.*